United States Patent [19]

Yamamoto et al.

[11] Patent Number: 5,140,053
[45] Date of Patent: Aug. 18, 1992

[54] FOAMABLE POLYMER COMPOSITION AND FOAMED ARTICLE

[75] Inventors: Yohzoh Yamamoto; Takasi Nakagawa, both of Yamaguchi, Japan

[73] Assignee: Mitsui Petrochemical Industries, Ltd., Tokyo, Japan

[21] Appl. No.: 481,631

[22] Filed: Feb. 20, 1990

[30] Foreign Application Priority Data

Feb. 20, 1989 [JP] Japan ................... 1-38453

[51] Int. Cl.$^5$ .......... C08F 32/00; C08J 9/04; C08L 47/00
[52] U.S. Cl. ................... 521/142; 521/73; 521/79; 521/134; 521/140; 521/150; 526/72; 526/283; 526/308
[58] Field of Search .............. 521/142, 150, 73, 79, 521/134, 140; 526/72, 283, 308

[56] References Cited

U.S. PATENT DOCUMENTS

| | | | |
|---|---|---|---|
| 2,799,668 | 7/1957 | Anderson et al. | 521/142 |
| 4,020,021 | 4/1977 | Lahouste et al. | 521/142 |
| 4,496,669 | 1/1985 | Leach | 521/150 |
| 4,598,102 | 7/1986 | Leach | 521/150 |
| 4,689,380 | 8/1987 | Nahn | 526/283 |
| 4,748,216 | 6/1988 | Tom | 526/283 |
| 4,891,387 | 1/1990 | Janda | 521/54 |

FOREIGN PATENT DOCUMENTS

0156464 10/1985 European Pat. Off. .
0348852 1/1990 European Pat. Off. .

OTHER PUBLICATIONS

Patent Abstracts of Japan, vol. 10, No. 335 (C-384)(2391), Nov. 13, 1986; JP-A61 138 6744 (Hayakawa Rubber) Jun. 26, 1986.
Patent Abstracts of Japan, vol. 8, No. 30 (C-209)(1467), Feb. 8, 1984; JP-A-58 194 929 (Mitsubishi Yuka) Nov. 14, 1983.

Primary Examiner—John Kight, III
Assistant Examiner—John M. Cooney, Jr.
Attorney, Agent, or Firm—Sherman and Shalloway

[57] ABSTRACT

A foamable polymer composition comprising
[A] at least one cyclo-olefin resin selected from the group consisting of
  (A-1) ring-opened polymers derived from cyclo-olefins represented by the following general formula [I],
  (A-2) ring-opened copolymers derived from the cyclo-olefins of general formula [I],
  (A-3) hydrogenation products of the ring-opened polymers (A-1),
  (A-4) hydrogenation products of the ring-opened copolyers (A-2), and
  (A-5) addition polymers of the cycloolefins of general formula [I] with ethylene, and
[B] a blowing agent,

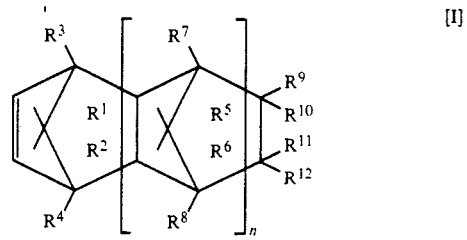

wherein n is 0 or a positive integer; $R^1$ to $R^{12}$, independently from each other, represent an atom or a group selected from the class consisting of a hydrogen atom, halogen atoms and hydrocarbon groups; $R^9$ to $R^{12}$ may be linked to each other to form a monocyclic or polycyclic hydrocarbon group; and $R^9$ and $R^{10}$, or $R^{11}$ and $R^{12}$ may each form an alkylidene group.

25 Claims, No Drawings

FOAMABLE POLYMER COMPOSITION AND FOAMED ARTICLE

This invention relates to a foamable polymer composition and to a foamed article therefrom. More specifically, it relates to a foamable polymer composition comprising a cyclo-olefin polymer as a resin component and capable of giving a foamed article having excellent thermal resistance and chemical resistance, and to a foamed article formed from the polymer composition.

DESCRIPTION OF THE PRIOR ART

Polystyrene or polyethylene has typically been used as a foamable polymer. Methods of foaming usually include mechanical stirring, the utilization of gases formed by a reaction, the use of blowing agents, and spraying. In particular, the method involving the utilization of gases formed by a reaction and the method involving using blowing agents have been much used.

However, foamed articles made from conventional materials such as polystyrene or polyethylene do not prove to have sufficient thermal resistance and chemical resistance in certain applications.

On the other hand, polymers obtained from various cyclo-olefins have been proposed. The prior art disclosing them will be briefly discussed below.

(i) Japanese Laid-Open Patent Publication No. 26024/1985

This publication describes an optical material composed of a polymer obtained by hydrogenating a ring-opened polymer derived from units of 1,4,5,8-dimethano-1,2,3,4,4a,5,8,8a-octahydronaphthalene or its derivative and units of norbornene or its derivatives.

(ii) Japanese Laid-Open Patent Publication No. 16808/1985 and U. S. Pat. No. 4,614,778

These publications describe a random copolymer of ethylene and a 1,4,5,8-dimethano-1,2,3,4,4a,5,8,8a-octahydronaphthalene and a process for its production.

(iii) Japanese Laid-Open Patent Publication No. 223013/1988

This patent document describes a polymer formed from 1,4,5,8-dimethano-1,2,3,4,4a,4b,5,8,8a,9a-decahydro-9H-fluorenone and as required ethylene.

(iv) Japanese Laid-Open Patent Publication No. 243111/1988

This patent document describes a polymer formed from 4,9,5,8-dimethano-3a,4,4a,5,8,8a,9,9a-octahydro-1H-benzoindene and, as required, ethylene.

(v) Japanese Laid-Open Patent Publication No. 305111/1988

This patent document describes a random copolymer formed from ethylene and a 2-alkylidene-1,4,5,8-dimethano-1,2,3,4,4a,5,8,8a-octahydronaphthalene, and a process for its production.

(vi) Japanese Laid-Open Patent Publication No. 185307/1989

This patent document describes a random copolymer formed from ethylene and a 5-aryl-bicyclo[2.2.1]-hept-2-ene compound and a process for its production.

The inventors have made investigations in order to develop foamed articles having excellent heat insulating property, cushioning property, compression characteristics, floating property and light weight by utilizing the excellent properties of the various polymers from cyclo-olefins. These investigations have now led to the discovery that a composition comprising a polymer of a cyclo-olefin and a blowing agent can be expanded well to a uniform foamed article because the blowing agent is well and uniformly dispersed in the polymer, and foamed articles obtained therefrom have excellent physical and electrical properties.

OBJECTIVES OF THE INVENTION

It is an objective of this invention to provide a foamable polymer composition for obtaining foamed articles having excellent heat resistance and chemical resistance. Another objective of this invention is to provide foamed articles having excellent heat resistance, chemical resistance, and electrical properties obtained from the foamable polymer composition.

SUMMARY OF THE INVENTION

These objectives of the invention are achieved in accordance with the invention by a foamable polymer composition comprising

[I] at least one cyclo-olefin resin selected from the group consisting of
  (A-1) ring-opened polymers derived from cyclo-olefins represented by the following general formula [I],
  (A-2) ring-opened copolymers derived from the cyclo-olefins of general formula [I],
  (A-3) hydrogenation products of the ring-opened polymers (A-1),
  (A-4) hydrogenation products of the ring-opened copolyers (A-2), and
  (A-5) addition polymers of the cycloolefins of general formula [I] with ethylene,

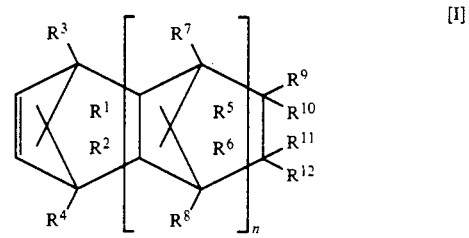

[I]

wherein n is 0 or a positive integer; $R^1$ to $R^{12}$, independently from each other, represent an atom or a group selected from the class consisting of a hydrogen atom, halogen atoms and hydrocarbon groups; $R^9$ to $R^{12}$ may be linked to each other to form a monocyclic or polycyclic hydrocarbon group; and $R^9$ and $R^{10}$, or $R^{11}$ and $R^{12}$ may each form an alkylidene group, and

[II] a blowing agent.

These objectives are also achieved by a foamed article of the polymer composition expanded to 1.05 to 5 times the volume of the polymer composition.

The foamed article of this invention is characterized by being expanded to 1.05 to 5 times the volume of the polymer composition.

The cyclo-olefin resins [A] used in this invention substantially have excellent thermal resistance, chemical resistance, solvent resistance and impact strength. Investigations of the present inventors have shown that in addition to having the above excellent properties, the cyclo-olefin resins [A] have the property of permitting a blowing agent to be well dispersed therein at the time of foaming and molding. Accordingly, by using the foamable polymer composition of this invention comprising the cyclo-olefin resin [A] and a blowing agent, foamed articles having very superior thermal resistance and chemical resistance and high uniformity can be produced. Furthermore, foamed articles prepared from this foamable polymer composition have excellent electrical properties.

The foamable polymer composition and foamed articles in accordance with this invention will be specifically described.

CYCLO-OLEFIN

The cyclo-olefin resin [A] includes polymers obtained by using the cyclo-olefins of general formula [I] given above as at least part of the starting monomers and can be classified as (A-1) to (A-5).

(A-1) ring-opened polymers derived from cyclo-olefins of general formula [I], (A-2) ring-opened copolymers derived from the cyclo-olefins of general formula [I], (A-3) hydrogenation products of the ring-opened polymers (A-1), (A-4) hydrogenation products of the ring-opened copolymers (A-2), and (A-5) addition polymers of the cyclo-olefins of general formula [I] with ethylene.

In general formula [I] representing the cyclo-olefins used in this invention n represents 0 or a positive integer; $R^1$ to $R^{12}$, independently from each other, represent an atom or a group selected from the class consisting of a hydrogen atom, halogen atoms and hydrocarbon groups; $R^9$ to $R^{12}$ may be linked to each other to form a monocyclic or polycyclic hydrocarbon; and $R^9$ and $R^{10}$ or $R^{11}$ and $R^{12}$ may each form an alkylidene group.

Preferred cyclo-olefins are those of general formula [I] in which n is 0 or an integer of 1 to 3; $R^1$ to $R^8$, independently from each other, represent an atom or a group selected from the class consisting of a hydrogen atom, halogen atoms and hydrocarbon groups having not more than 5 carbon atoms; $R^9$ to $R^{12}$, independently from each other, represent an atom or a group selected from the class consisting of a hydrogen atom, halogen atoms and hydrocarbon groups having not more than 10 carbon atoms; $R^9$ to $R^{12}$ may be linked to each other to form a monocyclic or polycyclic hydrocarbon group, and $R^9$ and or $R_{11}$ and $R^{12}$ may each form an alkylidene group having not more than 5 carbon atoms.

Where in general formula [I], $R^9$ to $R^{10}$ are linked to each other to form a monocyclic or polycyclic hydrocarbon group, the rings may have a crosslinked structure or a double bond, or may be a suitable combination of these rings. When any two of groups $R^9$ to $R^{12}$ together form the above ring, the total number of carbon atoms is suitably not more than 30, preferably not more than 25.

Examples of such monocyclic or polycyclic hydrocarbons are shown below.

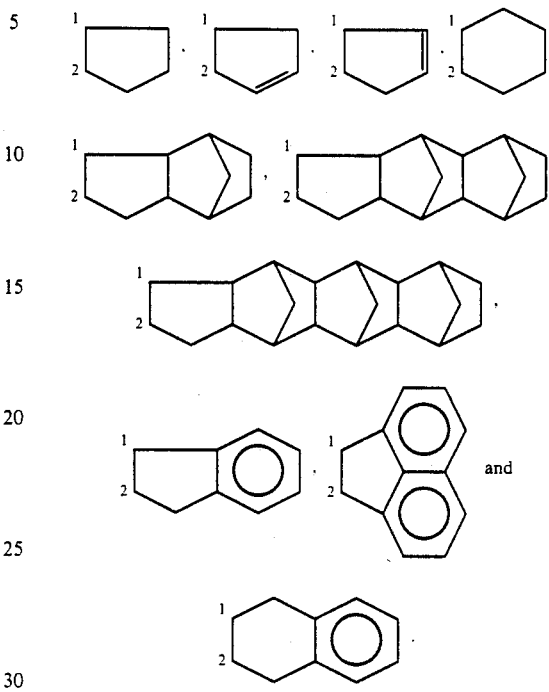

In the above formulae, the carbon atoms marked 1 and 2 represent the carbon atoms of a ring structure to which the groups represented by $R^9$ to $R^{12}$ in formula [I] are bonded. These groups may have an alkyl substituent such as a methyl group.

$R^9$ and $R^{11}$, or $R^{11}$ and $R^{12}$ may each form an alkylidene group. $R^9$ to $R^{12}$ may also be substituted by an ester group.

Among the cyclo-olefins of general formula [I], preferred cyclo-olefins are represented by the following formula [I-a]

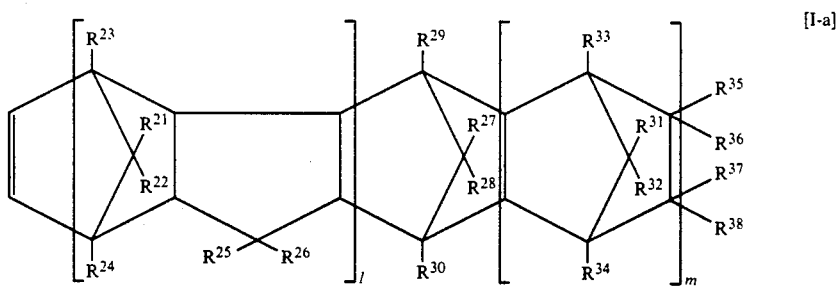

[I-a]

wherein l is 0 or 1 and m is 0 or a positive integer; $R^{21}$ to $R^{38}$, independently from each other, may be linked to each other to form a monocyclic or polycyclic hydrocarbon group which may have a double bond; $R^{35}$ and $R^{36}$, or $R^{37}$ and $R^{38}$ may each form an alkylidene group.

In general formula (I-a) preferred atoms or groups among $R^{21}$ to $R^{34}$ may be the same as the preferred atoms or groups described with regard to $R^1$ to $R^8$ in general formula [I].

Where in formula [I-a], $R^{35}$ to $R^{38}$ are bonded to each other to form a monocyclic or polycyclic hydrocarbon group, preferred and specific examples of the monocyclic or polycyclic hydrocarbon group are the same as those described above with regard to $R^9$ to $R^{12}$ in formula [I].

The cycloolefins of formula [I] also include those of the following general formula [I-b].

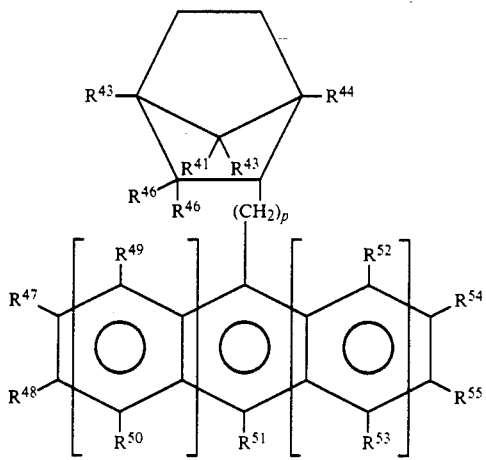

wherein p is 0 or an integer of at least 1, preferably 0 or an integer of 1 to 2. q and r, independently from each other, represent 0, 1 or 2; $R^{41}$ to $R^{55}$, independently from each other, represent an atom or a group selected from the class consisting of a hydrogen atom, halogen atoms, aliphatic hydrocarbon groups, aromatic hydrocarbon groups and alkoxy groups; $R^{45}$ (or $R^{46}$) and $R^{49}$ (or $R^{47}$) may be bonded directly or via an alkyl group having 1 to 3 carbon atoms.

Preferred examples of $R^{41}$ to $R^{55}$ in general formula [I-b] may be the same as described above with regard to $R^1$ to $R^8$ in general formula [I].

The cyclo-olefins of formulae [I], [I-a] and [I-b] used in this invention may be easily produced by condensing cyclopentadienes with the corresponding olefins or cyclo-olefins by the Diels-Alder reaction.

Examples of the cyclo-olefins of formulae [I], [I-a] and [I-b], used in this invention include
bicyclo[2,2,1]hept-2-ene derivatives,
tetracyclo[4,4,0,1$^{2,5}$, 1$^{7,13}$]-dodecene derivatives,
hexacyclo[6,6,1,1$^{3,6}$,1$^{10,13}$,0$^{2,7}$,0$^{9,14}$]-4-heptadecene derivatives,
octacyclo[8,8,0,1$^{2,9}$, 1$^{4,7}$,1$^{11,18}$,1$^{13,16}$,0$^{3,8}$, 0$^{12,17}$[-5-docosene derivatives,
pentacyclo[6,6,1,1$^{3,6}$,0$^{2,7}$,0$^{9,14}$]-4-hexadecene derivatives,
heptacyclo-5-eicosene derivatives,
heptacyclo-5-heneicosene derivatives,
tricyclo[4,3,0,1$^{2,5}$]-3-decene derivatives,
tricyclo[4,3,0,1$^{2,5}$]-3-undecene derivatives,
pentacyclo[6,5,1,1$^{3,6}$,0$^{2,7}$,0$^{9,13}$]-4-pentadecene derivatives,
pentacyclopentadecadiene derivatives,
pentacyclo[4,7,0,1$^{2,5}$,0$^{8,13}$,1$^{9,12}$]-3-pentadecene derivatives,
heptacyclo[7,8,0,1$^{3,6}$,0$^{2,7}$,1$^{10,17}$,0$^{11,16}$,1$^{12,15}$]-4-eicosene derivatives, and
nonacyclo[9,10,1,1$^{4,7}$,0$^{3,8}$,0$^{2,10}$,0$^{12,21}$,1$^{13,20}$, 0$^{14,19}$,1$^{15,18}$]-5-pentacosene derivatives.

---

(1) bicyclo[2,2,1]hept-2-ene derivatives such as

 bicyclo[2,2,1]hept-2-ene

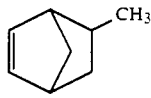 6-methylbicyclo[2,2,1]hept-2-ene

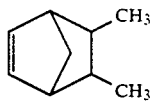 5,6-dimethylbicyclo-[2,2,1]hept-2-ene

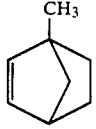 1-methylbicyclo[2,2,1]hept-2-ene

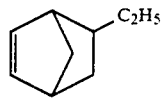 6-ethylbicyclo[2,2,1]hept-2-ene

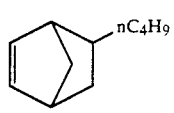 6-n-butylbicyclo[2,2,1]hept-2-ene

-continued

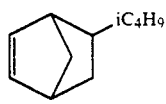 6-isobutylbicyclo[2.2.1]hept-2-ene

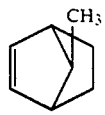 7-methylbicyclo[2.2.1]hept-2-ene (2) tetracyclo[4.4.0.1$^{2,5}$.1$^{7,10}$]-3-dodecene derivatives such as

 tetracyclo[4,4,0,1$^{2,5}$,1$^{7,10}$]-3-dodecene

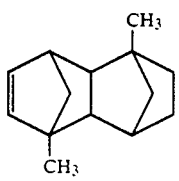 5,10-dimethyltetracyclo[4,4,0,1$^{2,5}$,1$^{7,10}$]-3-dodecene

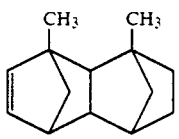 2,10-dimethyltetracyclo[4,4,0,1$^{2,5}$,1$^{7,10}$]-3-dodecene

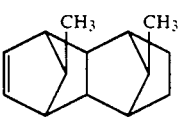 11,12-dimethyltetracyclo[4,4,0,1$^{2,5}$,1$^{7,10}$]-3-dodecene

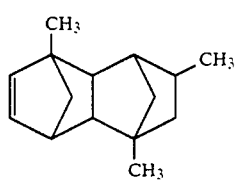 2,7,9-trimethyltetracyclo[4,4,0,1$^{2,5}$,1$^{7,10}$]-3-dodecene

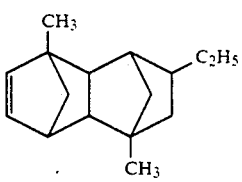 9-ethyl-2,7-dimethyltetracyclo[4,4,0,1$^{2,5}$,1$^{7,10}$]-3-dodecene

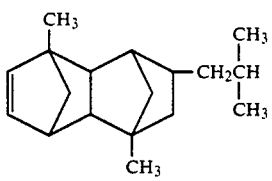 9-isobutyl-2,7-dimethyltetracyclo[4,4,0,1$^{2,5}$,1$^{7,10}$]-3-dodecene

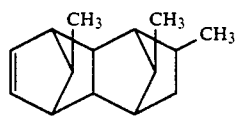 9,11,12-trimethyltetracyclo[4,4,0,1$^{2,5}$,1$^{7,10}$]-3-dodecene

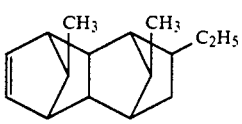 9-ethyl-11,12-dimethyltetracyclo[4,4,0,1$^{2,5}$,1$^{7,10}$]-3-dodecene -continued

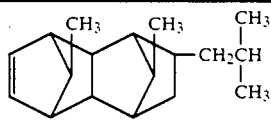  9-isobutyl-11,12-dimethyltetracyclo[4.4.0.1$^{2,5}$.1$^{7,10}$]-3-dodecene

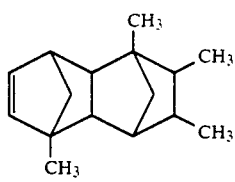  5,8,9,10-tetramethyltetracyclo[4.4.0.1$^{2,5}$.1$^{7,10}$]-3-dodecene

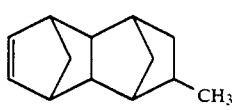  8-methyltetracyclo[4,4,0,1$^{2,5}$.1$^{7,10}$]-3-dodecene

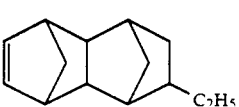  8-ethyltetracyclo[4,4,0,1$^{2,5}$.1$^{7,10}$]-3-dodecene

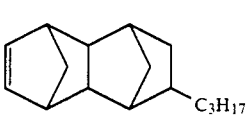  8-propyltetracyclo[4,4,0,1$^{2,5}$.1$^{7,10}$]-3-dodecene

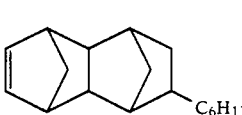  8-hexyltetracyclo[4,4,0,1$^{2,5}$.1$^{7,10}$]-3-dodecene

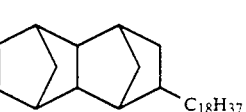  8-stearyltetracyclo[4,4,0,1$^{2,5}$.1$^{7,10}$]-3-dodecene

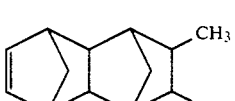  8,9-dimethyltetracyclo[4,4,0,1$^{2,5}$.1$^{7,10}$]-3-dodecene

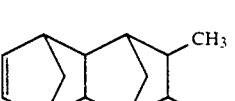  8-methyl-9-ethyltetracyclo[4,4,0,1$^{2,5}$.1$^{7,10}$]-3-dodecene

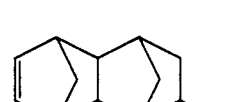  8-chlorotetracyclo[4,4,0,1$^{2,5}$.1$^{7,10}$]-3-dodecene

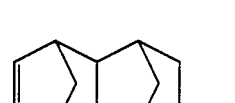  8-bromotetracyclo[4,4,0,1$^{2,5}$.1$^{7,10}$]-3-dodecene

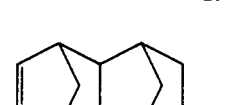  8-fluorotetracyclo[4,4,0,1$^{2,5}$.1$^{7,10}$]-3-dodecene

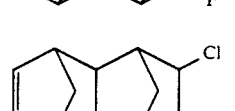  8,9-dichlorotetracyclo[4,4,0,1$^{2,5}$.1$^{7,10}$]-3-dodecene

-continued

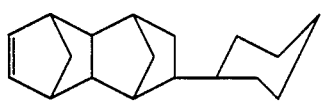 8-cyclohexyltetracyclo[4.4.0.1²·⁵,1⁷·¹⁰]-3-dodecene

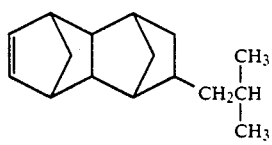 8-isobutyltetracyclo[4.4.0.1²·⁵,1⁷·¹⁰]-3-dodecene

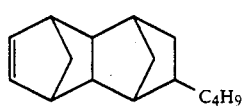 8-butyltetracyclo[4,4,0.1²·⁵,1⁷·¹⁰]-3-dodecene

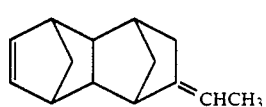 8-ethylidenetetracyclo[4,4,0.1²·⁵,1⁷·¹⁰]-3-dodecene

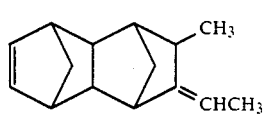 8-ethylidene-9-methyltetracyclo[4.4.0.1²·⁵,1⁷·¹⁰]-3-dodecene

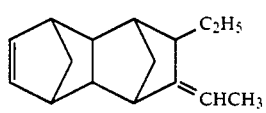 8-ethylidene-9-ethyltetracyclo[4,4,0.1²·⁵,1⁷·¹⁰]-3-dodecene

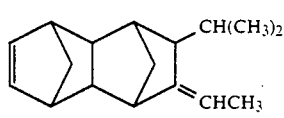 8-ethylidene-9-isopropyltetracyclo[4,4,0.1²·⁵,1⁷·¹⁰]-3-dodecene

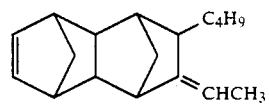 8-ethylidene-9-butyltetracyclo[4,4,0.1²·⁵,1⁷·¹⁰]-3-dodecene

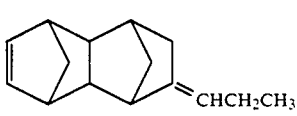 8-n-propylidenetetracyclo[4,4,0.1²·⁵,1⁷·¹⁰]-3-dodecene

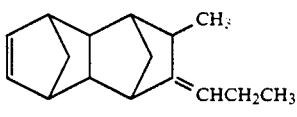 8-n-propylidene-9-methyltetracyclo[4,4,0.1²·⁵,1⁷·¹⁰]-3-dodecene

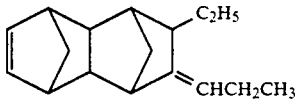 8-n-propylidene-9-ethyltetracyclo[4,4,0,1²·⁵,1⁷·¹⁰]-3-dodecene

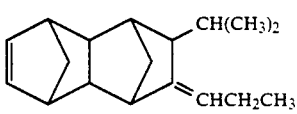 8-n-propylidene-9-isopropyltetracyclo[4,4,0,1²·⁵,1⁷·¹⁰]-3-dodecene

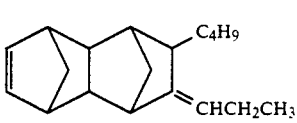 8-n-propylidene-9-butyltetracyclo[4,4,0,1²·⁵,1⁷·¹⁰]-3-dodecene

-continued

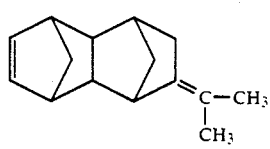 8-isopropylidene-tetracyclo[4.4.0.1$^{2,5}$.1$^{7,10}$]-3-dodecene

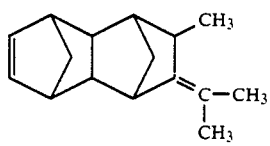 8-isopropylidene-9-methyltetracyclo[4,4,0,1$^{2,5}$,1$^{7,10}$]-3-dodecene

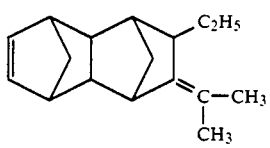 8-isopropylidene-9-ethyltetracyclo[4,4,0,1$^{2,5}$,1$^{7,10}$]-3-dodecene

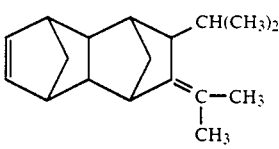 8-isopropylidene-9-isopropyltetracyclo[4,4,0,1$^{2,5}$,1$^{7,10}$]-3-dodecene

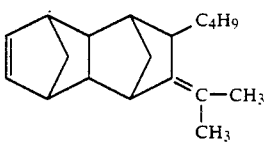 8-isopropylidene-9-butyltetracyclo[4,4,0,1$^{2,5}$,1$^{7,10}$]-3-dodecene (3) hexacyclo[6.6.1.1$^{3,6}$.1$^{10,13}$.0$^{2,7}$.0$^{9,14}$]-4-heptadecene derivatives such as

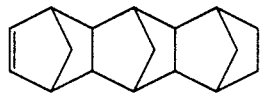 hexacyclo[6.6.1.1$^{3,6}$.1$^{10,13}$.0$^{2,7}$.0$^{9,14}$]-4-heptadecene

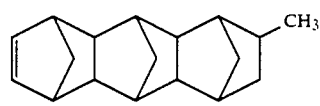 12-methylhexacyclo[6.6.1.1$^{3,6}$.1$^{10,13}$.0$^{2,7}$.0$^{9,14}$]-4-heptadecene

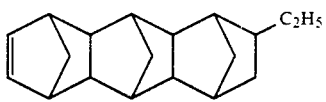 12-ethylhexacyclo[6.6.1.1$^{3,6}$.1$^{10,13}$.0$^{2,7}$.0$^{9,14}$]-4-heptadecene

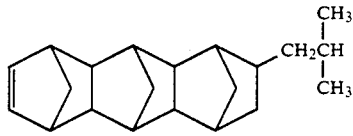 12-isobutylhexacyclo[6,6,1,1$^{3,6}$.1$^{10,13}$.0$^{2,7}$.0$^{9,14}$]-4-heptadecene

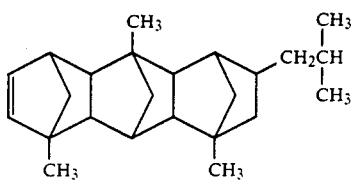 1,6,10-trimethyl-12-isobutylhexacyclo[6,6,1,1$^{3,6}$.1$^{10,13}$.0$^{2,7}$.0$^{9,14}$]-4-heptadecene (4) octacyclo[8.8.0.1$^{2,9}$.1$^{4,7}$.1$^{11,18}$.1$^{13,16}$.0$^{3,8}$.0$^{12,17}$]-5-docosene derivatives such as

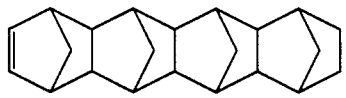 octacyclo[8.8.0.1$^{2,9}$.1$^{4,7}$.1$^{11,18}$.1$^{13,16}$.0$^{3,8}$.0$^{12,17}$]-5-docosene

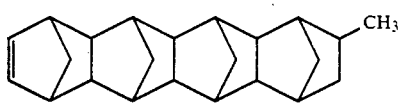 15-methyloctacyclo[8.8.0.1$^{2,9}$.1$^{4,7}$.1$^{11,18}$.1$^{13,16}$.0$^{3,8}$.0$^{12,17}$]-5-docosene

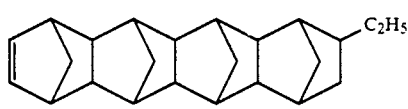 15-ethtyloctacyclo[8.8.0.1$^{2,9}$.1$^{4,7}$.1$^{11,18}$.1$^{13,16}$.0$^{3,8}$.0$^{12,17}$]-5-docosene (5) pentacyclo[6,6,1,1$^{3,6}$.0$^{2,7}$.0$^{9,14}$]-4-hexadecene derivatives such as

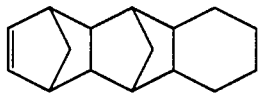 pentacyclo[6,6,1,1$^{3,6}$.0$^{2,7}$.0$^{9,14}$]-4-hexadecene

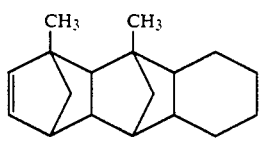 1,3-dimethylpentacyclo[6,6,1,1$^{3,6}$.0$^{2,7}$.0$^{9,14}$]-4-hexadecene

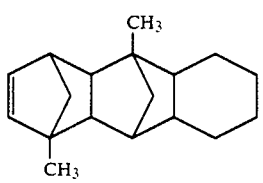 1,6-dimethylpentacyclo[6,6,1,1$^{3,6}$.0$^{2,7}$.0$^{9,14}$]-4-hexadecene

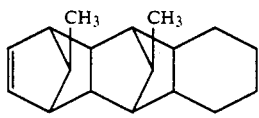 15,16-dimethylpentacyclo[6,6,1,1$^{3,6}$.0$^{2,7}$.0$^{9,14}$]-4-hexadecene (6) heptacyclo-6-eicosene or heptacyclo-5-heneicosene derivatives such as

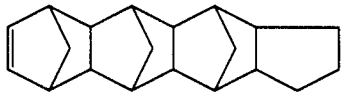 heptacyclo[8.7.0.1$^{2,9}$.1$^{4,7}$.1$^{11,17}$.0$^{3,8}$.0$^{12,16}$]-5-eicosene

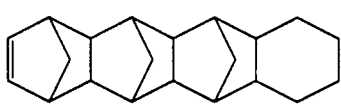 heptacyclo[8.7.0.1$^{2,9}$.1$^{4,7}$.1$^{11,18}$.0$^{3,8}$.0$^{12,17}$]-5-heneicosene (7) tricyclo[4,3,0,1$^{2,5}$]-3-decene derivatives such as

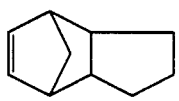 tricyclo[4,3,0,1$^{2,5}$]-3-decene

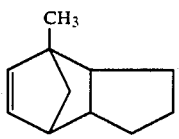 2-methyltricyclo[4,3,0,1$^{2,5}$]-3-decene

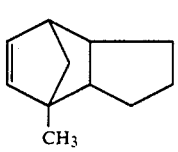 5-methyltricyclo[4,3,0,1$^{2,5}$]-3-decene (8) tricyclo[4.4.0.1^{2.5}]-3-undecene derivatives such as

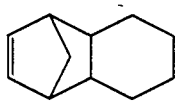
tricyclo[4.4.0.1^{2.5}]-3-undecene

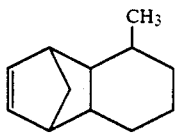
10-methyltricyclo[4,4,0,1^{2.5}]-3-undecene (9) pentacyclo[6.5.1,1^{3.6},0^{2.7},0^{9.13}]-4-pentadecene derivatives such as

pentacyclo[6,5,1,1^{3.6},0^{2.7},0^{9.13}]-4-pentadecene

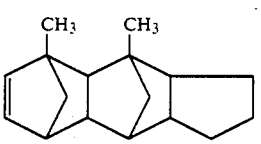
1,3-dimethylpentacyclo[6,5,1,1^{3.6},0^{2.7},0^{9.13}]-4-pentadecene

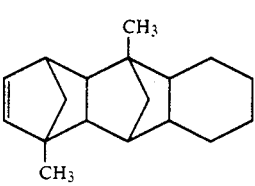
1,6-dimethylpentacyclo[6.5.1,1^{3.6},0^{2.7},0^{9.13}]-4-pentadecene

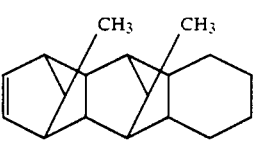
14,15-dimethylpentacyclo[6.5.1,1^{3.6},0^{2.7},0^{9.13}]-4-pentadecene

(10) diene compounds such as

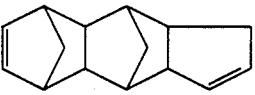
pentacyclo[6.5,1,1^{3.6},0^{2.7},0^{9.13}]-4,10-pentadecadiene

(11) pentacyclo[4,7,0,1^{2.5},0^{8.13},1^{9.12}]-3-pentadecene derivatives such as

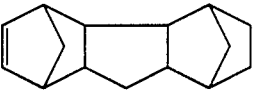
pentacyclo[4,7,0,1^{2.5},0^{8.13},1^{9.12}]-3-pentadecene

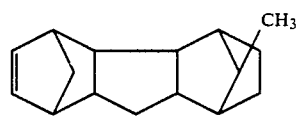
methyl-substituted pentacyclo[4,7,0,1^{2.5},0^{8.13},1^{9.12}]-3-pentadecene

(12) heptacyclo[7,8,0,1^{3.6},0^{2.7},1^{10.17},0^{11.16},1^{12.15}]-4-eicosene derivatives such as

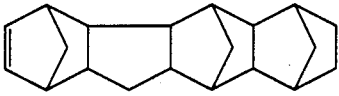
heptacyclo[7,8,0,1^{3.6},0^{2.7},1^{10.17},0^{11.16},1^{12.15}]-4-eicosene

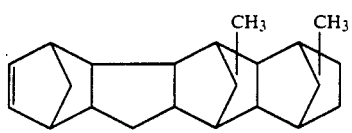
dimethyl-substituted heptacyclo[7,8,0,1^{3.6},0^{2.7},1^{10.17}, 0^{11.16},1^{12.15}]-4-eicosene

(13) nonacyclo[9,10,1,1^{4.7},0^{3.8},0^{2.18},0^{12.21},1^{13.20},0^{14.19},1^{15.18}]-5-pentacosene derivatives such as

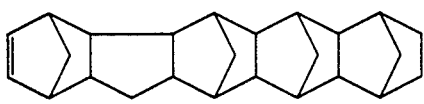
nonacyclo[9.10.1.1$^{4,7}$.0$^{3,8}$.0$^{2,18}$.0$^{12,21}$.1$^{13,20}$.0$^{14,19}$.1$^{15,18}$]-5-pentacosene

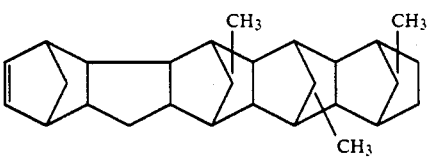
trimethyl substituted nonacyclo[9.10.1.1$^{4,7}$.0$^{3,8}$.0$^{2,18}$.0$^{12,21}$.1$^{13,20}$.0$^{14,19}$.1$^{15,18}$]-5-pentacosene.

Other examples include:

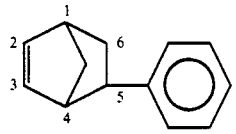
5-phenyl-bicyclo[2.2.1]hept-2-ene

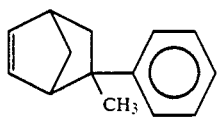
5-methyl-5-phenyl-bicyclo[2.2.1]hept-2-ene

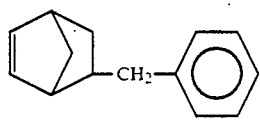
5-benzyl-bicyclo[2.2.1]hept-2-ene

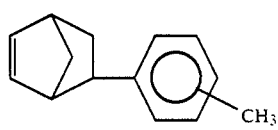
5-tolyl-bicyclo[2.2.1]hept-2-ene

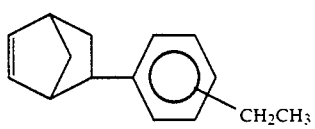
5-(ethylphenyl)-bicyclo[2.2.1]hept-2-ene

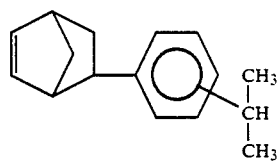
5-(isopropylphenyl)-bicyclo[2.2.1]hept-2-ene

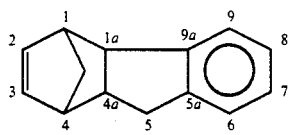
1,4-methano-1,1a,4,4a-tetrahydrofluorene

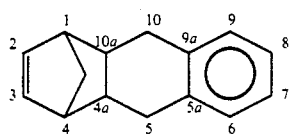
1,4-methano-1,4,4a,5,10,10a-hexahydroanthracene

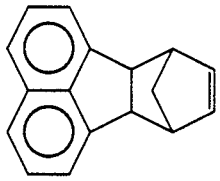

cyclopentadiene-acenaphthylene adduct

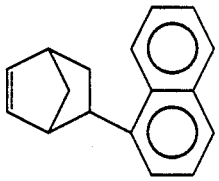

5-(α-naphthyl)-bicyclo[2,2,1]hept-2-ene, and

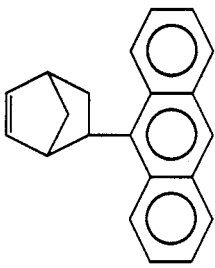

5-(anthracenyl)-bicyclo[2,2,1]-hept-2-ene.

In addition to the above examples, further examples of the polycyclic olefins of formula [I], include octahydronaphthalenes such as 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano1,2,3,4,4a,5,8,8a-octahydronaphthalene, 2-hexyl-1,4,5,8-d imethano-1,2,3,4,4a,5,8,8a-octahydronaphthalene, 2,3-di-methyl-1,4,5,8-dimethano-1,2,3,4,4a,5,8,8a-octahydrona phthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8 -dimethano-1,2,3,4,4a,5,8,8a-octahydronaphthalene, 2-fluoro-1,4,5,8-dimethano-1,2,3,4,4a,5,8,8a-octahydronaphthalene, 2,3-dichloro1,4,5,8-dimethano-1,2,3,4,4a,5,8,8a-octahydronaphthalene, 2-cyclohexyl-1,4,5 ,8-dimethano-1,2,3,4,4a,5,8,8a-octahydronaphthalene, 2-n-butyl -1,4,5,8-dimethano-1,2,3,4,4a,5,6,8a-octahydronaphthalene, and 2-isobutyl-1,4,5,8-dimethano-1,2,3,4,4a,5,8,8a-octahydronaphthalene.

CYCLO-OLEFIN RESINS

In the present invention, the cyclo-olefinic resin (A) constituting the foamable polymer composition is at least one resin selected from the group consisting of (A-1) ring-opened polymers or ring-opened copolymers derived from the above cyclo-olefins of general formula [I], (A-2) ring-opened copolymer of the cyclo-olefins of formula [I], (A-3) hydrogenation products of the polymers (A-1), (A-4) hydrogenation products of the copolymers (A-2), (A-5) addition polymers of the cyclo-olefins of general formula [I1] with ethylene.

The cyclo-olefin ring-opened polymers can be prepared by a known method by ring-opening polymerization of the cyclo-olefins of formula [I], [I-a]or [I-b]. In the present invention, cyclo-olefinic ring-opened polymers prepared by using the above cyclo-olefins singly, and ring-opened copolymers prepared by ring-opening polymerizations of two or more cyclo-olefins may be used. Examples of such ring-opened polymers or copolymers are (co)polymers of 1,4,5,8-dimethano-1,2,3,4,4a,5,8,8a-octahydronaphthalenes with each other, and ring-opened copolymers of 1,4,5,8-dimethano-1,2,3,4,4a,5,8,8a-octahydronaphthalenes with norbornenes (bicyclo[2,2,1]hept-2-enes).

In the cyclo-olefinic ring-opened polymers prepared as above, a double bond remains. The double bonds may be easily hydrogenated by known methods. In the present invention, hydrogenation products of the cyclo-olefin ring-opened (co)polymers (A-1) and (A-2) so obtained may also be used. This hydrogenation will further improve thermal stability and weather resistance.

The ring-opened (co)polymers and their hydrogenation products (A-3) and (A-4) of these (co)polymers used as the cyclo-olefin polymers in this invention will be described below taking up the cyclo-olefins of formula [II]as examples. It is thought that the cyclo-olefin of formula [II] reacts as described below and constitute the ring-opened (co)polymers and their hydrogenation products.

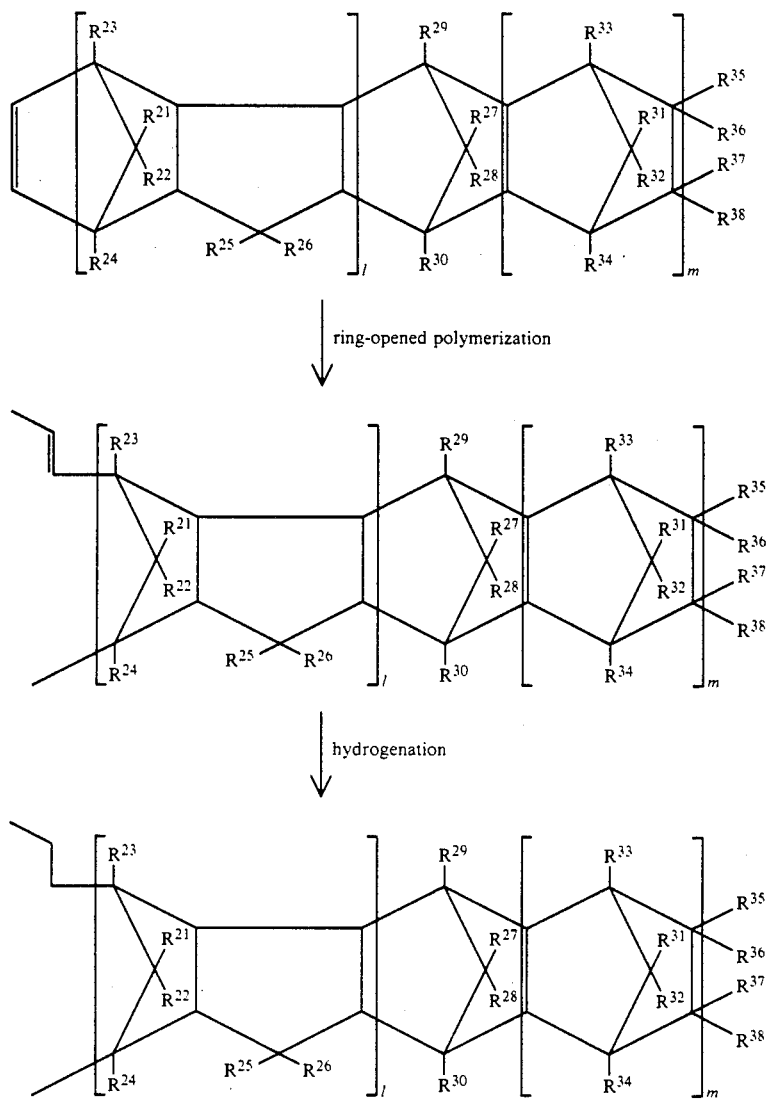

In the above formulae, $R^{21}$ to $R^{38}$, m and n are as defined in formula [I-a].

In the ring-opening polymerization, cyclo-olefins other than the cyclo-olefins of formula [I], [I-a] or [I-b] may be used. Examples of the other cyclo-olefins include cyclobutene, cyclopentene, cyclohexene, 3,4-dimethylcyclopentene, 3-methylcyclohexene, 2-(2-methylbutyl)-1-cyclohexene, 2,3,3a,7a-tetrahydro-4,7-methano-1H-indene and 3a,5,6,7a-tetrahydro-4,7-methano-1H-indene.

The other cyclo-olefin that can be copolymerized is used desirably in an amount of not more than 20 mole %, preferably not more than 15 mole %, based on the cyclo-olefin of formula [I], [I-a] or [I-b].

In addition to polymers (A-1) to (A-4), the addition polymers of the cyclo-olefins [I] with ethylene (A-5) may also be used in this invention.

These addition polymers may sometimes be referred to hereinbelow as the "cyclo-olefin addition polymers".

The cyclo-olefin addition polymers used as the cyclo-olefinic resins in this invention are addition polymers of the cyclo-olefins of formula [I], [I-a] or [I-b] and ethylene. In the cyclo-olefin addition polymers, the ratio of recurring units derived from ethylene to recurring units derived from the cyclo-olefin is usually from 10:90 to 90:10, preferably from 50:50 to from 75:25.

The cyclo-olefin addition polymers can be produced by polymerizing ethylene and a cyclo-olefin in a hydrocarbon medium in the presence of a catalyst formed from a hydrocarbon-soluble vanadium compound and a halogen-containing organoaluminum.

Such a polymerization is already known and is proposed, for example, in Japanese Laid-Open Patent Publication No. 168708/1985 (corresponding to U.S. Pat. No. 4,614,778).

It is believed that in such a cyclo-olefin addition polymer, at least a part of the cyclo-olefin of formula [I-a] has the structure shown in the following formula [II] and bonded randomly to recurring units derived from ethylene.

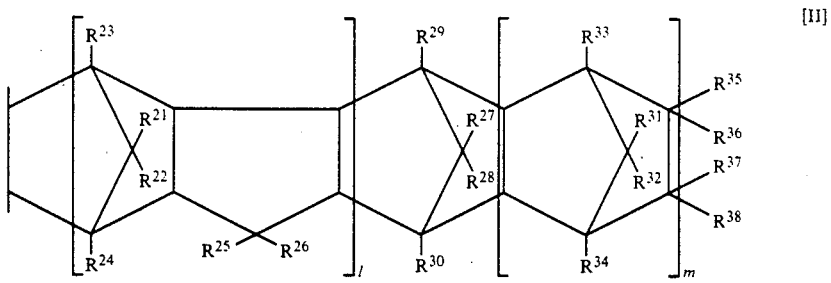

[II]

In formula [II], $R^{21}$ to $R^{38}$, l and m are the same as defined in formula [I-a].

The cyclo-olefin addition polymers used in this invention and a cyclo-olefin is obtained by addition-polymerization of the ethylene component and the cyclo-olefin component, and an alpha-olefin and a cyclo-olefin other than the cyclo-olefins represented by formula [I], (other cyclo-olefins) so long as these additional olefin components do not impair the properties of the final addition polymer.

The alpha-olefin or the other cyclo-olefin is used desirably in a proportion of not more than 20 mole %, preferably not more than 15 mole %, copolymerized in the cyclo-olefin addition polymer.

The alpha-olefin used may be linear or branched, and includes, for example, alpha-olefins having 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene, and 1-eicosene. Of these, alpha-olefins having 3 to 15, particularly 3 to 10, carbon atoms are preferably used.

The term "other cyclo-olefins", as used herein, broadly denotes unsaturated polycyclic hydrocarbon compounds excluding the cyclo-olefins of formulae [I], [I-a] and [I-b].

Specific examples of the other cyclo-olefins include cyclobutene, cyclopentene, cyclohexene, 3,4-dimethyl-cyclopentene, 3-methylcyclohexene, 2-(2-methylbutyl)-1-cyclohexene, styrene, alpha-methylstyrene, 2,3,3a,7a-tetrahydro-4,7-methano-1H-indene and 3a,5,6,7a-tetahydro-4,7-methano-1H-indene.

When the other cyclo-olefin has two or more double bonds within the molecule, those double bonds which remain unused in the addition polymerization may be hydrogenated for the purpose of improving weatherability.

For example, when the above addition polymerization is carried out and if required, hydrogenation is further carried out, the resulting cyclo-olefin addition polymer has an iodine number of usually not more than 5, mostly not more than 1.

$^{13}$C-NMR measurement of the resulting cyclo-olefin addition polymer leads to the determination that the starting cyclo-olefin has the structure of [II], for example.

The resulting cyclo-olefin addition polymer has a chemically stable structure and excellent heat aging resistance. The cyclo-olefinic ring-opened (co)polymers (A-1) and (A-2) and their hydrogenation products (A-3) and (A-4) and the cyclo-olefin addition polymers (2) described above have an intrinsic viscosity, measured in decalin at 135° C., of 0.05 to 10 dl/g, preferably 0.08 to 8 dl/g.

These cyclo-olefin resins (A) are generally amorphous or low-crystalline, preferably amorphous. Accordingly, they have good transparency. Specifically, these cyclo-olefin resins have a crystallinity, measured by X-ray, of not more than 5 %, mostly 0 %. When the melting points of the cyclo-olefin resin (A) are measured by using a differential scanning calorimeter, frequently their melting points are not observed.

They have a heat-decomposition temperature of 350° to 420° C., in most cases 370° to 400° C. These cyclo-olefin resins have a glass transition temperatures of usually 50° to 230° C., and in many cases, within 70° to 210° C. Hence, when they are directly used as a material for the composition, they have a softening temperature measured usually at 70° to 250° C., mostly 370° to 400° C.

As mechanical properties, they have a flexural modulus of usually $1 \times 10^4$ to $5 \times 10^4$ kg/cm$^2$ and a flexural strength of usually 300 to 1500 kg/cm$^2$.

These cyclo-olefin polymers also have a density of 0.86 to 1.10 g/cm$^3$, mostly 0.88 to 1.08 g/cm$^3$, and a refractive index, measured in accordance with ASTM D542, of 1.47 to 1.58, mostly 1.48 to 1.56. Since they are substantially amorphous, they have a haze, determined by ASTM D1003, of usually not more than 20% and mostly not more than 10%.

As electrical properties, they have a dielectric constant (1 KHz), measured in accordance with ASTM D150, of 1.5 to 3.0, mostly 1.9 to 2.6, and a dielectric loss tangent of $9 \times 10^4$ to $8 \times 10^5$, mostly $3 \times 10^{-4}$ to $9 \times 10^{-5}$.

Foamed articles formed from the composition of this invention comprising the cycloolefin resin A]have excellent chemical resistance. For example, even when the foamed article is immersed for 24 hours in sulfuric acid, aqueous ammonia, acetone or ethyl acetate, discoloration, craking, deformation and dissolution are not observed.

A so-called polymer alloy obtained by blending the cyclo-olefin resin A) with various other resins [B] may also be used as a material for the polymer composition. In this case, the weight proportion of the cyclo-olefin resin [A] to the other resin [B] is from 100:0 to 50:50, preferably from 100:0 to 70:30.

Examples of the resin [B] are given in (1) to (17) below.

(1) Polymers derived from hydrocarbons having one or two unsaturated bonds

Examples are polyolefins such as polyethylene, polypropylene, polymethylbutene-1, poly(4-methyl-pentene-1), polybutene-1 and polystyrenes (which may have a crosslinked structure).

(2) Halogen-containing vinyl polymers

Specific examples are polyvinyl chloride, polyvinylidene chloride, polyvinyl fluoride, polytetrafluoroethylene, polychloroprene and chlorinated rubbers.

(3) Polymers derived from alpha,beta-unsaturated acids

Specific examples include polyacrylate, polymethacrylate, polyacrylamide, polyacrylonitrile, copolymers of the monomers constituting the above polymers, such as acrylonitrile/butadiene/styrenecopolymer, acrylonitrile/stryene copolymer and acrylonitrile/styrene/acrylate copolymers.

(4) Polymers derived from unsaturated alcohols, amines or their acyl derivatives or acetals Specific examples include polyvinyl alcohol, polyvinyl acetate, polyvinyl stearate, polyvinylbenzoate, polyvinyl maleate polyvinylbutyral, polyallyl phthalate, polyallyl melamine, copolymers of the monomers constituting the above polymers such as ethylene/vinyl acetate copolymer.

(5) Polymers derived from epoxides

Specific examples are polyethylene oxide and polymers derived from bis-glycidyl ether.

(6) Polyacetal

Specific examples are polyoxymethylene, polyoxyethylene and polyoxymethylene containing ethylene oxide as a comonomer.

(7) polyphenylene oxide polymers (8) polycarbonates (9) Polysulfones

(10) Polyurethanes and urea resins

(11) Polyamides and copolyamides derived from diamines and dicarboxylic acids and/or aminocarboxylic acids and the corresponding lactams. Specific examples are nylon 6, nylon 66, nylon 11 and nylon 12.

(12) Polyesters derived from dicarboxylic acids and dialcohols and/or hydroxycarboxylic acids or the corresponding lactones.

Specific examples are polyethylene terephthalate, polybutylene terephthalate, and poly-1,4-dimethylol cyclohexane terephthalate.

(13) Polymers having a crosslinked structure and derived from aldehydes, phenols and urea or melamine Specific examples include phenol-formaldehyde resins, urea-formaldehyde resins and malemine-formaldeyde

(14) Alkyd resins such as glycerol-phthalic acid resin.

(15) Unsaturated resins derived from copolyesters of saturated or unsaturated dicarboxylic acids and polyhydric alcohols using vinyl compounds as a cross-linking agent, and halogen-containing modified resins.

(16) Natural polymers such as cellulose, rubbers, proteins, and their derivatives such as cellulose derivatives, e.g. cellulose propionate and cellulose

(17) Flexible polymers

They are particularly rubber components selected from (i) to (v).

FLEXIBLE POLYMERS (I) CONTAINING UNITS DERIVED FROM CYCLO-OLEFINS

The flexible polymers containing units derived from cyclo-olefins can be prepared by copolymerizing ethylene, the cyclo-olefins of formula [I], [I-a] or [I-b] described above with regard to the cyclo-olefin polymers, and alpha-olefins. The alpha-olefins are preferably alpha-olefins having 3 to 20 carbon atoms. Examples of preferred alpha-olefins for use in this invention include propylene, 1-propylene, 1-butene, 4-methyl-1-butene, 1-hexene, 1-octene, 1-decene, 1-dodecene, 1-tetradecene, 1-hexadecene, 1-octadecene and 1-eicosene.

Such cyclo-olefins or cyclodienes as ethylidene norbornene and dicyclopentadiene may used besides the above alpha-olefins or together with alpha-olefins.

In the flexible polymers (i) containing units derived from cyclo-olefins, the recurring units derived from ethylene are contained in a proportion of 40 to 98 mole %, preferably 50 to 90 mole %, and the recurring units derived from the alpha-olefin are contained in a proportion of 2 to 50 mole %. The recurring units derived from cycloolefin are contained in a proportion of 2 to 20 mole %, preferably 2 to 15 mole %.

Unlike the above cyclo-olefin polymers, the flexible polymers (i) have a glass transition temperature of not more than 0° C., preferably not more than −10°, and have an intrinsic viscosity, measured in decalin at 135° C., of 0.01 to 10 dl/g, preferably 0.08 to 7 dl/g. The flexible polymers (i) have a crystallinity, measured by X-ray diffractometry, of 0 to 10%, preferably 0 to 7%, especially preferably 0 to 5%.

The flexible polymers (i) may be produced under properly selected conditions in the methods described, for example, in Japanese Laid-Open Patent Publications Nos. 168708/1985, 120816/1986, 115912/1986, 115916/1986, 271308/1986, 272216/1986, and 252406/1987.

ALPHA-OLEFIN COPOLYMERS (II)

The alpha-olefin copolymers (ii) used as the flexible polymers are amorphous or low-crystalline copolymers polymers of at least two types of alpha-olefins. Examples of low-crystalline copolymers are ethylene/alpha-olefin copolymers and propylene/alpha-olefin copolymers.

As the alpha-olefins constituting the ethylene/alpha-olefin copolymers, alpha-olefins having 3 to 20 carbon atoms are usually suitable. Specific examples are propylene, 1-butene, 4-methyl-1-butene, 1-hexene, 1-octene, 1-decene and mixtures of these. Among them, alpha-olefins having 3 to 10 carbon atoms are especially preferred.

In the ethylene/alpha-olefin copolymers, the mole ratio of the recurring units derived from ethylene to the recurring units derived from alpha-olefin is preferably adjusted to from 40:60 to 95:5, although it varies depending upon the type of the alpha-olefin. The above mole ratio is preferably from 40:60 to 90:10 if the alpha-olefin used is propylene. If the alpha-olefin has 4 or more carbon atoms, the above mole ratio is preferably from 50:50 to 95:5.

As the alpha-olefins constituting the propylene/alpha-olefin copolymers, alpha-olefins having 4 to 20 carbon atoms are generally used. Specific examples are 1-butene, 4-methyl-1-pentene, 1-hexene, 1-octene, 1-decene and mixtures of these. Alpha-olefins having 4 to 10 carbon atoms are especially preferred.

In the above propylene/alpha-olefin copolymers, the mole ratio of the recurring units derived from propylene to the recurring units derived from the alpha-olefins is preferably from 50:50 to 95:5 although it may vary depending upon the type of the alpha-olefin.

ALPHA-OLEFIN/DIENE COPOLYMERS (III)

Ethylene/alpha-olefin/diene copolymer rubbers and propylene/alpha-olefin/diene copolymer rubbers are used as the alpha-olefin diene copolymers (iii) used as the flexible polymers.

Alpha-olefins constituting such copolymer rubbers usually have 3 to 20 carbon atoms (4 to 20 carbon atoms in the case of the propylene/alpha-olefin/diene rubbers). Examples include propylene, 1-butene, 1-pentene, 4-methyl-1-pentene, 1-hexene, 1-octene, 1-decene and mixtures of these. Of these, alpha-olefins having 3 to 10 carbon atoms are especially preferred.

Examples of the dienes constituting these copolymer rubbers include aliphatic non-conjugated dienes such as 1,4-hexadiene, 1,5-octadiene, 2-methyl-1,5-hexadiene, 6-methyl-1,5-heptadiene and 7-methyl-1,6-octadiene; cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloro-methyl-5-isopropenyl-2-norbornene; and 2,3-diisopropylidene-5-norbornene, 2-ethylidene-3-isopropylidene-5-norbornene and 2-propenyl-2,2-norbornadiene.

In the ethylene/alpha-olefine/diene copolymer rubbers, the mole ratio of the recurring units derived from ethylene to the recurring units derived from alpha-olefin is preferably from 40:60 to 90:10 in general, although it may vary depending upon the type of the alpha-olefin.

The content of the recurring units derived from the diene in these copolymer rubbers is usually 1 to 20 mole %, preferably 2 to 15 mole %.

AROMATIC VINYL HYDROCARBON-CONJUGATED DIENE-TYPE FLEXIBLE COPOLYMERS (IV)

Aromatic vinyl hydrocarbon/conjugated diene random copolymers or block copolymers or hydrogenation products of these copolymers are used as the aromatic vinyl hydrogen/conjugated diene flexible copolymers used as the flexible polymers.

Specific examples include styrene/butadiene block copolymer rubber, styrene/butadiene/styrene block copolymer rubber, hydrogenated styrene/butadiene/styrene block copolymer, hydrogenated styrene/isoprene/styrene block copolymer rubber, and styrene/butadiene random copolymer rubber.

In these copolymer rubbers, the mole ratio of the recurring units derived from the aromatic vinyl hydrocarbon to the recurring units derived from the conjugated diene is usually from 10:90 to 70:30. The hydrogenated copolymer rubbers are copolymer rubbers obtained by hydrogenating the double bonds remaining in the copolymer rubbers partly or wholly.

FLEXIBLE POLYMERS OR COPOLYMERS (V) COMPRISING ISOBUTYLENE OR ISOBUTYLENE AND A CONJUGATED DIENE

Specific examples of the flexible polymer or copolymer (v) are polyisobutylene rubber, polyisoprene rubber, polybutadiene rubber and isobutylene/isoprene copolymer rubber.

The flexible copolymers (ii) to (v) have the same properties as the cycloolefin polymers (i). Usually they have an intrinsic viscosity, measured in decalin at 135° C., of 0.01 to 10 dl/g, preferably 0.08 to 7 dl/g, a glass transition temperature (Tg) of not more than 0° C., preferably not more than −10° C., especially preferably not more than −20° C., and a crystallinity, measured by X-ray diffractometry, of usually 0 to 10%, preferably 0 to 7%, and especially preferably 0 to 5%.

These flexible polymers (i) to (v) may be used directly, or after a crosslinked structure is formed in them, they may be blended with the cyclo-olefin resin [A]. Alternatively, after they are blended with the cyclo-olefin resin [A], a crosslinked structure may be formed. The polymer alloys containing such rubber components and crosslinkable polymer alloys treated with organic peroxides are present in an amount of 5 to 150 parts by weight, preferably 5 to 100 parts by weight, especially preferably 10 to 80 parts by weight, as the total amount of the flexible polymers (i) to (v), per 100 parts by weight of the cyclo-olefin addition polymer. By meeting these blending ratio requirement, polymer alloys having impact strength, rigidity, heat distortion temperature, and hardness in a well-balanced combination can be obtained.

Preferably, the polymer alloys have a melt flow index (MFR under the condition of ASTM D1238) of preferably 0.1 to 100.

To form a crosslinked structure as above, organic peroxides are usually used. Examples of organic peroxides used to perform crosslinking polymerization include (a) ketone peroxides such as methyl ethyl ketone peroxide and cyclohexane and 2,2-bis(t-butylperoxy)octane cyclohexanone peroxide; (b) peroxy ketals such as 1,1-bis(t-butylperoxy)cyclohexane and 2,2-bis(t-butylperoxy)octane; (c) hydroperoxides such as t-butyl hydroperoxide, cumene hydroperoxide, 2,5-dimethylhexane-2,5-dihydroxyperoxide and 1,1,3,3-tetramethylbutyl hydroperoxide; (d) dialkyl peroxides such as di-t-butyl peroxide, 2,5-dimethyl-2,5-di(t-butylperoxy)hexane and 2,5-dimethyl-2,5-di(t-butylperoxy)hexyne-3; (e) diacyl peroxides such as lauroyl peroxide and benzoyl peroxide; and (f) peroxy esters such as t-butyl peroxyacetate, t-butyl peroxybenzoate and 2,5-dimethyl-2,5-di(benzoylperoxy)hexane.

The amount of the organic peroxide component to be incorporated is usually 0.01 to 1 part by weight, preferably 0.05 to 0.5 part by weight, per 100 parts by weight of the cyclo-olefin addition polymer and the flexible polymer combined.

By further including a compound having two or more radical polymerizable functional groups in the molecule at the time of treatment with the organic peroxide, polymer alloys having excellent impact strength can be obtained. Specifically, by carrying out the crosslinking reaction in the presence of the compound having two or more radical polymerizable functional groups in the molecule, the crosslinking efficiency increases.

Examples of the compound having at least two radical-polymerizable functional groups in the molecule include divinylbenzene, vinyl acrylate and vinyl methacrylate. These compounds may be used in an amount of usually not more than 1 part by weight, preferably 0.1 to 0.5 part by weight, per 100 parts by weight of the cycloolefin resin and the flexible polymer combined.

The foamable polymer composition in this invention can be obtained by blending the cyclo-olefin resin (A). Blowing agents used in this invention and a method of foaming the composition will be described.

BLOWING AGENTS

The blowing agents used in this invention are roughly classified as (1) decomposable blowing agents and (2) evaporable blowing agents.

The decomposable blowing agents are those which utilize gases evolved by chemical decomposition. The evaporable blowing agents are liquid or gaseous physical blowing agents which volatilize without a chemical change.

(1) Decomposable blowing agents

The decomposable blowing agents include inorganic decomposable blowing agents and organic decomposable blowing agents.

In the present invention, both of these blowing agents are properly used.

Examples of the inorganic decomposable blowing agents are sodium hydrogen carbonate, ammonium carbonate, ammonium hydrogen carbonate, ammonium nitrite, azide compounds, sodium borohydride and light metals.

Examples of the organic decomposable blowing agents are azodicarbonamide, barium azodicarboxylate, N,N'-dinitrosopentamethylenetetramine, 4,4-oxybis(-benzenesulfonylhydrazine), diphenylsulfone-3,3-disulfonylhydrazide, p-toluenesulfonylsemicarbazide and biurea. Blowing agents for high temperature use cited herein may also be used properly.

The decomposition temperature of the blowing agents, the amount of a gas evolved and the speed of its decomposition are important factors for selection of the blowing agent. Accordingly, a foaming aid may be added to the blowing agent to adjust its decomposition temperature, the amount of a gas evolved and the decomposition speed. The foaming aids may be those usually employed, such as oxalic acid, succinic acid, citric acid, urea, borax and ethanolamine.

To expand the resin by using the decomposable blowing agent, the resin is blended with a blowing agent at a temperature above the melting point of the resin but below the decomposition temperature of the blowing agent, and the resulting kneaded mixture is heated to a temperature above the decomposition temperature of the blowing agents and thus expanded under atmospheric pressure. There may also be used an extruding expansion method which comprises extruding a mixture of the resin and is extruded in the molten state from a die, and thus, the pressure exerted on the molten mass is changed from a high pressure to an atmospheric pressure thereby to expand the resin.

There may also be used a pressurized foaming method in which a mixture of the resin and a blowing agent is filled in a closed mold and heated under pressure to decompose the blowing agent, then the pressure is released to vary the pressure, and thereby the resin is abruptly expanded.

There may also be used an injection expansion method in which by utilizing injection molding, a uniformly expanded core layer and a non-expanded skin layer are formed.

In the present invention, any of the methods described above may be utilized.

In the pressure expansion method, a bridging agent or a radical generator may be used as required.

(2) Evaporable blowing agents

The evaporable blowing agents may be, for example, aliphatic hydrocarbons, chlorinated aliphatic hydrocarbons, fluorinated aliphatic hydrocarbons and inert gases. Specific examples of the evaporable blowing agents are easily volatilizable organic liquids such as pentane, hexane, heptane, isoheptane, benzene, toluene, methylene dichloride, trichloroethylene, dichloroethane, dichlorotetrafluoroethane and trichlorofluoroethane and easily volatilizable gases such as helium.

As a method of expansion using an evaporable blowing agent, there may be used a method in which a mixture of a pulverulent polymer and the evaporable blowing agent is filled in a mold and heated at a temperature above the boiling point of the blowing agent and to a temperature at which the polymer is softened, thereby forming a porous expanded article. The above-cited extrusion expansion method may also be used in this case.

Any of the above-exemplified methods may be used in this method.

Any of the above-exemplified methods may be used in this method.

BLENDING PORTIONS OF THE CYCLO-OLEFIN POLYMER AND THE BLOWING AGENT

In the foamable polymer composition of this invention, the cyclo-olefin resin and the blowing agent are blended in a weight ratio of 100:0.1 to 100:5 although the ratio may differ depending upon the type of the blowing agent.

The blowing agent is mixed with, or dispersed in, the cyclo-olefin resin by known methods.

When the foamable polymer composition of this invention is used to produce a foamed article, the expansion ratio may be properly set according to the purpose of using the resulting foamed article, for example. Usually, it is set at 1.05 to 5 times, preferably 1.1 to 3 times, the volume of the foamable polymer composition.

The foamed article obtained in this manner is light in weight and excellent in various properties, typically thermal resistance, chemical resistance and electrical properties.

OTHER ADDITIVES

The foamable polymer composition of this invention composed of the cyclo-olefin resin and a blowing agent may further comprise a heat stabilizer, a weather stabilizer, an antistatic agent, a slip agent, an anti-blocking agent, an anti-haze agent, a lubricant, a dye, a pigment, a natural oil, a synthetic oil, a wax and an organic or inorganic filler so long as these additives do not impair the objectives of the present invention.

Examples of stabilizers that can be incorporated in the composition of this invention include phenolic antioxidants such as tetrakis[methylene-3-(3,5-di-t-butyl-4-hydroxyphenyl)propionate]methane, alkyl beta-(3,5-di-t-butyl-4-hydroxyphenyl)propionate and 2,2'-oxamidebis[ethyl-3-(3,5-di-t-butyl-4-hydroxyphenyl)-propionate, polyhydric alcohol aliphatic acid esters such as glycerin monostearate, glycerin distearate, pentaerythrititol monostearate, pentaerythritol distearate and pentaerythritol tristearate. They may be used either singly or in combination. For example, a combination of tetrakis[methylene-3-(3,5-di-butyl-4-hydroxyphenyl) propionate] methane, zinc stearate and glycerin monostearate may be cited as an example.

Examples of the organic or inorganic fillers include silica, diatomaceous earth, alumina, titanium dioxide, magnesium oxide, pumice powder, pumice balloons, aluminum hydroxide, magnesium hydroxide, basic magnesium carbonate, dolomite, calcium sulfate, potassium titanate, barium sulfate, mica, asbestos, glass fibers, glass flakes, glass beads, calcium silicate, montmorrilonite, bentonite, graphite, aluminum powder, molybdenum sulfide, boron fibers, silicon carbide fibers, polyethylene fibers, polypropylene fibers, polyester fibers and polyamide fibers.

The cyclo-olefin resin and the other components may be mixed by known methods. For example, all of the components may be simultaneously mixed.

The foamed articles obtained from the foamable polymer composition of this invention may be further processed, for example, by vacuum forming, pressing, slip forming, pressure forming, printing, coating, plating, hair implanting, embossing, and lamination with a metal or another resin.

The foamed articles of the invention can be used, for example, in the following applications.

(1) Applications by utilizing heat insulating property

Heat insulation and dew prevention of roofs, ceilings, walls and floors of buildings, thermally insulated warehouses, temperature control of pipes and tanks, electric refrigerators, bath tubs, air conditioners, showcases, cooling or warming containers, automobile ceilings, linings of doors, and food containers (for tea, noodles, soup, etc.).

(2) Applications utilizing cushion property

Cushioning packages for household electrical appliances, precision machines and instruments and foods, food receptacles such as trays, automobile instrument panels, armlets, side pillars, and sporting goods such as headgears and protectors.

(3) Applications utilizing compression characteristics

Containier packings, sealing materials and backup materials.

(4) Applications utilizing floating property and light weight

Lifesaving devices for ships and boats, buoyancy structures, floats, various overwater playing devices, and base plates for parabola antennas and flat antennas.

(5) Applications utilizing acoustical properties

Sound-insulating materials for machine rooms, acoustic rooms and broadcasting rooms.

The foamed articles produced from the foamable polymer composition of this invention have excellent thermal resistance and chemical resistance, and find wider applications than conventional foamed articles.

Since the composition of this invention comprises a cyclo-olefin resin [A] as a resin component, foamed articles produced from it have excellent thermal resistance, chemical resistance and electrical properties which can find extensive use.

The following examples illustrate the present invention specifically.

The various properties given below were measured and evaluated by the methods given below.

(1) Melt flow index (MFR)

Measured at a predetermined temperature (T°C.) under a load of 2.16 kg in accordance with ASTM-D1238.

(2) Softening temperature (TMA)

By using a Thermomechanical Analyzer of E. I. Du Pont de Nemours & Co., the softening temperature of a sheet having a thickness of 1 mm was measured by observing its heat distortion behavior. A quartz needle was placed on the sheet, and a load of 49 g was applied. The sheet was heated at a rate of 5° C./min. The temperature at which the needle penetrated the sheet to a depth of 0.635 mm was measured and defined as TMA.

(3) Glass transition temperature (Tg)

Measured by DSC-20 (supplied by Seiko Electronics Industry Co., Ltd.) at a temperature elevating rate of 10°/min.

(4) Tensile test

A dumbell-shaped test piece of ASTM type IV was punched out from the foamed article obtained in a working example. The tensile test was carried out on the resulting test piece by the method of ASTM-D638 at 23°C.

(5) Flexural test

A test piece having a width of ½ inch and a length of 5 inches was cut out from the foamed article obtained in a working example. The flexural test was carried out on the resulting test piece in accordance with ASTM-D790 at a testing temperature of 23° C. and a testing speed of 20 mm/min.

(6) Izod impact test

A test piece having a width of ½ inch and a length of 3 inches (unnotched) was cut out from the foamed article obtained in a working example. The flexural test was carried out on the resulting test piece in accordance with ASTM-D256 at a testing temperature of 23° C.

(7) Rockwell hardness

Measured in accordance with ASTM-D785 (R scale) on the foamed article obtained in a working example.

(8) Expansion ratio

Determined by comparison of the specific gravity of the foamed article with that of the article before expansion.

(9) Chemical resistance

The foamed article obtained in a working example was immersed in a testing solution specified below at 23° C. for 7 days. When there was no change in the appearance of the tested article, and the tensile strength at break of the article measured by the method shown in (4) above was at least 90% of that measured before this test, this article was rated as "acceptable" in this test.

TESTING SOLUTION

A 20 % aqueous solution of sulfuric acid (for testing acid resistance).

A 20 % aqueous solution of sodium hydroxide (for testing alkali resistance).

EXAMPLE 1

One kilogram of a random copolymer of ethylene and 1,4,5,8-dimethano-1,2,3,4,4a,5,8,8a-octahydronaphthalene (having the structural formula

to be abbreviated DMON) (ethylene content measured by $^{13}$C-NMR 70 mole %; MFR measured at 260° C. 20 g/min; Intrinsic viscosity measured in decalin at 135° C. 0.6 dl/g; TMA: 115° C.) as a cyclco-olefin copolymer was mixed with 10 g of a 6:4 by weight mixture of azodicarbonamide and sodium hydrogen carbonate as a blowing agent to prepare a foamable polymer composition. This composition was injection molded and expanded under the following conditions to obtain a plate-like article having a size of 350 mm×100 mm×5 mm. Test samples were prepared from this article, and their properties were measured.

The results are shown in Table 1.

MOLDING CONDITIONS

Cylinder temperature: 230° C.

Injection pressure (primary/secondary); 700/500 kg/cm$^2$

Mold temperature: 70° C.

EXAMPLE 2

Example 1 was repeated except that a random copolymer of ethylene and DMON (ethylene content measured by $^{13}$C-NMR: 62 mole %; MFR measured at 260°:35 g/min.; intrinsic viscosity measured in decalin at 135° C.: 0.47 dl/g; TMA: 148° C.) was used as the cyclo-olefin polymer, and the molding conditions were changed as shown below.

MOLDING CONDITIONS

Cylinder temperature: 250° C.
Injection pressures (primary/secondary): 700/500 kg/cm$^2$
Mold temperature: 90° C.
The results are shown in Table 1.

EXAMPLE 3

Pellets (3.4 kg) of an ethylene/DMON random copolymer (ethylene content measured by $^{13}$C-NMR: 67 mole%; MFR measured at 260° C.: 17 g/min; Intrinsic viscosity measured in decalin at 135° C.: 0.6 dl/g; TMA: 135° C.; Tg: 123° C.) and 0.6 kg of pellets of an ethylene/propylene random copolymer (ethylene content: 80 mole %; Tg: −54° C.; Intrinsic viscosity: 2.2 dl/g) were mixed and melt-blended at a cylinder temperature of 220° C. by a twin-screw extruder (PCM 45 supplied by Ikegai Tekkosha Co., Ltd.), and pelletized by a pelletizer.

Example 1 was repeated except that the resulting pellets were used instead of the cyclo-olefin copolymer in Example 1, and the molding conditions were changed as shown below.

MOLDING CONDITIONS

Cylinder temperature: 240° C.
Injection pressures (primary/secondary): 00/500 kg/cm$^2$
Molding temperature: 80° C.

EXAMPLE 4

Four kilograms of pellets of an ethylene/propylene random copolymer (ethylene content measured by $^{13}$C-NMR 62 mole %; MFR measured at 260° C.: 35 g/min.; intrinsic viscosity measured in decalin at 135° C.: 0.47 dl/g; TMA: 148° C.; Tg: 137° C.) as a cyclo-olefin copolymer were mixed with 1 kg of pellets of an ethylene/propylene random copolymer (ethylene content: 80 mole %; Tg: −54° C.; intrinsic viscosity: 2.2 dl/g) and then melt-blended at a cylinder temperature of 220° C. by a twin-screw extruder (PCM45 supplied by Ikegai Tekko Co., Ltd.), and pelletized by a pelletizer.

To 1 kg of the resulting pellets, 1 g of Perhexyne 25B (a registered trademark of Nippon Oils and Fats Co., Ltd.) and 3 g of divinylbenzene were added, and they were fully mixed. The resulting mixture was melt-kneaded by a twin-screw extruder at a cylinder temperature of 230° C., and pelletized by a pelletizer. One kg of the pellets were mixed with 10 g of a blowing agent to prepare a foamable polymer composition. The composition was injection-molded and foamed under the following molding conditions to prepare a plate-like article having a size of 350 mm × 100 mm × 5 mm. Test samples were prepared from the molded article, and their properties were measured. The results are shown in Table 1.

MOLDING CONDITIONS

Cylinder temperature: 250° C.
Injection pressures (primary/secondary): 700/500 kg/cm$^2$
Mold temperature: 90° C.

TABLE 1

| PROPERTIES | EXAMPLE 1 | EXAMPLE 2 | EXAMPLE 3 | EXAMPLE 4 |
|---|---|---|---|---|
| Tensile Test | | | | |
| Tensile strength (kg/cm$^2$) | 290 | 260 | 320 | 370 |
| Elongation at break (%) | 5 | 4 | 4 | 6 |
| Flexural test | | | | |
| Flexural strength (kg/cm$^2$) | 470 | 430 | 530 | 530 |
| Flexural modulus (kg/cm$^2$) | 15000 | 16200 | 12900 | 13300 |
| Izod impact strength (kg-cm/cm) | 4 | 4 | 7 | 10 |
| HDT (264 psi) (°C.) | 80 | 115 | 100 | 115 |
| Expansion ratio (times the volume of the foamable polymer composition) | 1.2 | 1.2 | 1.2 | 1.3 |
| Chemical resistance | | | | |
| Acid resistance | Acceptable | Acceptable | Acceptable | Acceptable |
| Alkali resistance | Acceptable | Acceptable | Acceptable | Acceptable |

We claim:
1. A foamable thermoplastic polymer composition comprising
   (1) at least one cyclo-olefin resin selected from the group consisting of
   ring-opened polymers derived from olefins represented by the following general formula (I) and hydrogenation products thereof

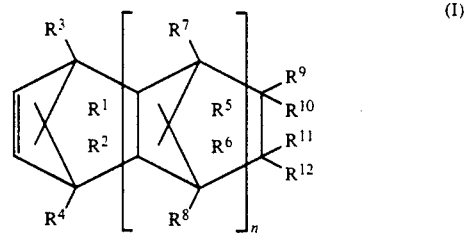

wherein n is 0 or a positive integer; R$^1$ to R$^{12}$, independently of each other, represent a member selected from the group consisting of hydrogen, halogen and hydrocarbon groups; R$^9$ to R$^{12}$ may be linked to each other to form a monocyclic or polycyclic hydrocarbon group; and R$^9$ and R$^{10}$, or R$^{11}$ and R$^{12}$ may each form an aklylidene group; and
   (2) a blowing agent.
2. The foamable polymer composition of claim 22 which further comprises at least one another resin (B) selected from the group consisting of polymers derived from hydrocarbons, chlorine-containing polymers, polymers derived from unsaturated acids, polymers derived from unsaturated alcohols or amines, polymers derived from epoxides, polyacetals, polyphenylene oxides, polycarbonates, polysulfones, urea resins, polyamide resins, polyester resins, formamide resins and natural polymers.

3. The foamable polymer composition of claim 2 in which the weight ratio of the cyclo-olefin resin (A) and the other resin (B) is in the range of 100:0 to 50:50.

4. The foamable polymer composition of claim 1, 2 or 3 in which n is 0 or an integer of 1 to 3, $R^1$ to $R^8$, independent of each other, represent a member selected from the group consisting of hydrogen, halogen and hydrocarbon groups having not more than 5 carbon atoms, $R^9$ to $R^{12}$, independent of each other, represent a member selected from the group consisting of hydrogen, halogen and hydrocarbon groups having not more than 10 carbon atoms, $R^9$ to $R^{12}$ may be linked to each other to form a monocyclic or polycyclic hydrocarbon group, and $R^9$ and $R^{10}$, or $R^{11}$ and $R^{12}$ may each form an alkylidene group.

5. A foamed article obtained by expanding the foamable polymer composition of claim 1 to 1.05 to 5 times the volume of the composition.

6. The foamed article of claim 5 which further comprises at least one other resin (B) selected from the group consisting of polymers derived from hydrocarbons, chlorine-containing polymers, polymers derived from unsaturated acids, polymers derived from unsaturated alcohols or amines, polymers derived from epoxides, polyacetals, polyphenylene oxides, polycarbonates, polysulfones, urea resins, polyamide resins, polyester resins, formamide resins and natural polymers.

7. The foamed article of claim 6 in which the weight ratio of the cyclo-olefin resin (A) to the other resin (B) is from 100:0 to 50:50.

8. The foamed article of claim 5 or 6 in which n is 0 or an integer of 1 to 3, $R^1$ to $R^8$, independent of each other, represent a member selected from the group consisting of hydrogen, halogen and hydrocarbon groups having not more than 5 carbon atoms, $R^9$ to $R^{12}$, independent of each other, represent a member selected from the group consisting of hydrogen, halogen and hydrocarbon groups having not more than 10 carbon atoms, $R^9$ to $R^{12}$ may be linked to each other to form a monocyclic or polycyclic hydrocarbon group, and $R^9$ and $R^{10}$, or $R^{11}$ and $R^{12}$ may each form an alkylidene group.

9. The foamable polymer composition of claim 1 wherein at least one cyclo-olefin resin comprises a ring-opened polymer derived from one or more cyclo-olefins of formula (I) or said hydrogenation product thereof.

10. The foamable polymer composition of claim 1 wherein at least one cyclo-olefin resin comprises a ring-opened copolymer derived form a cyclo-olefin of formula (I) and another cyclo-olefin other than the cyclo-olefin of formula (I), or the hydrogenation product of said copolymer.

11. The foamable polymer composition of claim 10 wherein said copolymer contains up to 20 mole % of said another cyclo-olefin.

12. The foamable polymer composition of claim 11 wherein said another cyclo-olefin is cyclobutene, cyclopentene, cyclohexene, 3,4-dimethylcyclopentene, 3-methycyclohexene,2-(2-methylbutyl)-1-cyclohexene, 2,3,3a,7a-tetrahydro-4,7-methano-1H-indene or 3a,5,6,7a-tetrahydro-4,7-methano-1H-indene.

13. A foamable polymer composition comprising
(A-5) addition polymers of cyclo-olefins of the following general formula [I-a] or [I-b] with ethylene, and
(B) a blowing agent,

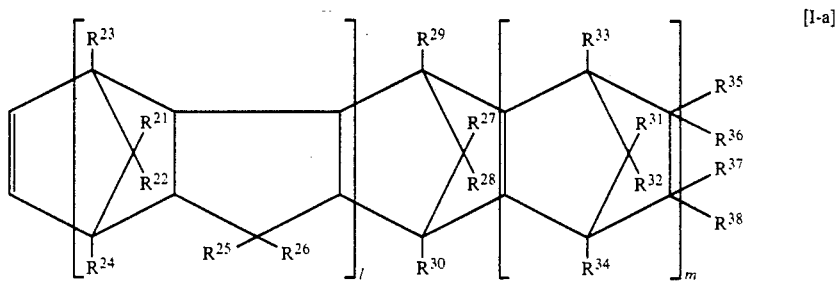

wherein l is 0 or 1 and m is 0 or a positive integer with the proviso that when l is 0, m is a positive member; $R^{21}$ to $R^{38}$, independent of each other, may be linked to each other to form a monocyclic or polycyclic hydrocarbon group which may have a double bond; $R^{35}$ and $R^{36}$, or $R^{37}$ and $R^{38}$ may each form an alkylidene group;

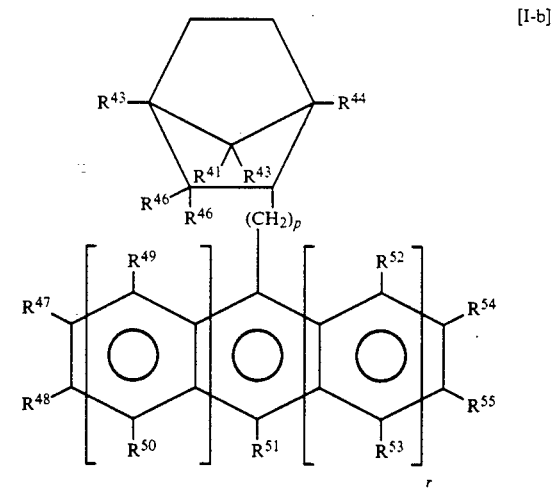

wherein p is 0 or an integer of at least 1, q and r, independent of each other, represent 0, 1 or 2; $R^{41}$ to $R^{45}$, independent of each other, represent a member selected from the group consisting of hydrogen, halogen, aliphatic hydrocarbon groups, aromatic hydrocarbon groups and alkoxy groups; $R^{45}$ (or $R^{46}$) and $R^{49}$ (or $R^{47}$) are bonded directly or via an alkyl group having 1 to 3 carbon atoms.

14. The foamable polymer composition of claim 13 in which the cyclo-olefin of formula [I-b] is 1,4-methano-1,1a,4,4a-tetrahydrofluorene.

15. The foamable polymer composition of claim 9 which further comprises at least one other resin (B) selected from the group consisting of polymers derived from hydrocarbons, chlorine-containing polymers, polymers derived from unsaturated acids, polymers derived from unsaturated alcohols or amines, polymers derived from epoxides, polyacetals, polyphenylene oxides, polycarbonates, polysulfones, urea resins, polyamide resin, polyester resins, formamide resins and natural polymers.

16. The foamable polymer composition of claim 15 in which the weight ratio of the cyclo-olefin resin (A) to the other resin (B) is in the range of 100:0 to 50:50.

17. A foamed article obtained by expanding the foamable polymer composition of claim 13 to 1.05 to 5 times the volume of the composition.

18. The foamed article of claim 17 which further comprises at least on other resin (B) selected from the group consisting of polymers derived from hydrocarbons, chlorine-containing polymers, polymers derived from unsaturated acids, polymers derived from epoxides, polyacetals, polyphenylene oxides, polycarbonates, polysulfones, urea resins, polyamide resins, polyester resins, formamide resins and natural polymers.

19. The foamed article of claim 17 in which the weight ratio of the cyclo-olefin resin (A) to the other resin (B) is from 100:0 to 50:50.

20. The foamed article of claim 17 which comprises an addition polymer of the cyclo-olefin of formula with ethylene.

21. The foamed article of claim 20 wherein in formula $R^{21}$ to $R^{34}$, independent of each other, represent a member selected from the group consisting of hydrogen, halogen and hydrocarbon groups having not more than 5 carbon atoms, and $R^{35}$ to $R^{38}$ independent of each other, represent a member selected from the group consisting of hydrogen, halogen and hydrogen groups having not more than 10 carbon atoms, or $R^{35}$ to $R^{38}$ are linked to each other to form a monocyclic or polycyclic hydrocarbon group, or $R^{35}$ and $R^{36}$ or $R^{37}$ and $R^{38}$ form an alkylidene group.

22. The foamed article of claim 21 which further comprises at least one other resin (B) selected from the group consisting of polymers derived from hydrocarbons, chlorine-containing polymers, polymers derived from unsaturated acids, polymers derived from epoxides, polyacetals, polyphenylene oxides, polycarbonates, polysulfones, urea resins, polyamide resins, polyester resins, formamide resins and natural polymers.

23. The foamed article of claim 17 wherein the foamable polymer composition comprises the addition polymer of the cyclo-olefin of formula with ethylene.

24. The foamed article of claim 23 wherein p is 0, 1 or 2, q and r, independent of each other, represent 0, 1 or 2, $R^{41}$ to $R^{55}$, independent of each other, represent a member selected from the group consisting of hydrogen, halogen, aliphatic hydrocarbon groups having not more than 10 carbon atoms, aromatic hydrocarbon groups having not more than 10 carbon atoms and alkoxy groups having not more than 10 carbons atoms, and $R^{45}$ (or $R^{46}$) and $R^{49}$ (or $R^{47}$) may be bonded directly or via an alkyl group having 1 to 3 carbon atoms.

25. The foamed article of claim 24 which further comprises at least one other resin (B) selected from the group consisting of polymers derived from hydrocarbons, chlorine-containing polymers, polymers derived from unsaturated acids, polymers derived from epoxides, polyacetals, polyphenylene oxides, polycarbonates, polysulfones, urea resins, polyamide resins, polyester resins, formamide resins and natural polymers.

* * * * *